(12) United States Patent
Murad et al.

(10) Patent No.: US 10,549,694 B2
(45) Date of Patent: Feb. 4, 2020

(54) VEHICLE-TRAILER REARVIEW VISION SYSTEM AND METHOD

(71) Applicant: GM GLOBAL TECHNOLOGY OPERATIONS LLC, Detroit, MI (US)

(72) Inventors: Mohannad Murad, Warren, MI (US); Fred W. Huntzicker, Warren, MI (US); Caroline Chung, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 24 days.

(21) Appl. No.: 15/889,470

(22) Filed: Feb. 6, 2018

(65) Prior Publication Data

US 2019/0241126 A1    Aug. 8, 2019

(51) Int. Cl.
*B60R 1/00* (2006.01)
*B60R 1/04* (2006.01)
*B60R 1/12* (2006.01)

(52) U.S. Cl.
CPC ............ *B60R 1/003* (2013.01); *B60R 1/00* (2013.01); *B60R 1/04* (2013.01); *B60R 1/12* (2013.01); *B60R 2001/1253* (2013.01); *B60R 2300/105* (2013.01); *B60R 2300/303* (2013.01); *B60R 2300/8046* (2013.01); *B60R 2300/8066* (2013.01)

(58) Field of Classification Search
CPC .... B60R 1/003; B60R 1/04; B60R 2001/1284
USPC ......................................................... 348/148
See application file for complete search history.

(56) References Cited

U.S. PATENT DOCUMENTS

| | | | |
|---|---|---|---|
| 2016/0379411 A1* | 12/2016 | Harbach | G06F 3/147 345/633 |
| 2017/0280091 A1* | 9/2017 | Greenwood | B60R 1/00 |
| 2018/0224932 A1* | 8/2018 | Von Novak | G06F 3/013 |

* cited by examiner

*Primary Examiner* — Jeffery A Williams
(74) *Attorney, Agent, or Firm* — Reising Ethington, P.C.

(57) ABSTRACT

A method and system for generating a combined rearview image of an area behind a vehicle that is towing a trailer, the method including: capturing a first image from a vehicle camera that is installed on the vehicle, the first image being comprised of an area behind the vehicle; capturing a second image from a trailer camera that is installed on the trailer, the second image being comprised of an area behind the trailer; determining an obstructed viewing region within the first image, the obstructed viewing region being a region of the first image in which the trailer resides; overlaying the second image on the first image and at least partially within the obstructed viewing region; and inserting graphics in the first image, in the second image, and/or in a patch region within the obstructed viewing region and between the second image and the first image.

20 Claims, 6 Drawing Sheets

*Figure 10*

VEHICLE-TRAILER REARVIEW VISION SYSTEM AND METHOD

FIELD

The present invention relates generally to generating and displaying an area behind a vehicle and trailer through the use of cameras installed on both the vehicle and the trailer.

BACKGROUND

Many vehicles can come equipped with some type of towing package, which typically includes a trailer hitch and a trailer connector. The trailer connector provides electrical power from the vehicle to the trailer and powers electrical components on the trailer, such as tail lights and/or electric braking devices. Some trailers now include a camera that is positioned on the rear end of the trailer and that faces an area behind the trailer. The video feed that is captured by the trailer camera can be communicated to the towing vehicle (i.e., the vehicle that is towing the trailer) and displayed for viewing by a vehicle operator or passenger. Additionally, many vehicles include a rear-facing camera that faces an area behind the vehicle. However, the field of view of the rear-facing camera of the vehicle is oftentimes obstructed by the trailer.

SUMMARY

According to one embodiment, there is provided a method of generating a combined rearview image of an area behind a vehicle that is towing a trailer, the method including: capturing a first image from a vehicle camera that is installed on the vehicle, the first image being comprised of an area behind the vehicle; capturing a second image from a trailer camera that is installed on the trailer, the second image being comprised of an area behind the trailer; determining an obstructed viewing region within the first image, the obstructed viewing region being a region of the first image in which the trailer resides; overlaying the second image on the first image and at least partially within the obstructed viewing region; and inserting graphics in the first image, in the second image, and/or in a patch region within the obstructed viewing region and between the second image and the first image.

According to various embodiments, this method may further include any one of the following features or any technically-feasible combination of these features:

the step of determining an image overlay area within the first image and/or at least partly overlapping the obstructed viewing region, wherein the second image is overlaid within the image overlay area;
 the step of determining a trailer articulation angle, wherein the image overlay area is determined based at least partly on the trailer articulation angle;
 the step of processing the second image so that the second image after the processing depicts the area behind the trailer from a perspective having a viewing angle that is the same as a viewing angle of the vehicle camera;
 the processing step is based at least partly on a trailer camera viewing angle and a vehicle camera viewing angle;
 at least some of the graphics do not depict or attempt to depict the area behind the vehicle or the area behind the trailer, and wherein the at least some of the graphics highlight one or more roadway features;
 at least some of the graphics depict or attempt to depict the area behind the vehicle and/or the area behind the trailer;
 the at least some of the graphics are obtained using scene memorization techniques, wherein the scene memorization techniques include the steps of: retaining at least a portion of the first image and, subsequently, recalling the portion of the first image, and using the recalled portion of the first image to fill in at least a portion of the patch regions within the obstructed viewing region; and/or
 the step of displaying the combined rearview image on an electronic display mirror included in the vehicle, wherein the electronic display mirror is a rearview mirror that enables a vehicle operator or a vehicle passenger to view an area behind the vehicle, and wherein the display of the combined rearview image enables the vehicle operator or the vehicle passenger to view the area behind the vehicle and the area behind the trailer without being obstructed by the trailer.

According to another embodiment, there is provided a method of generating a combined rearview image of an area behind a vehicle that is towing a trailer, the method including: capturing a first image from a vehicle camera that is installed on the vehicle, the first image being comprised of an area behind the vehicle; capturing a second image from a trailer camera that is installed on the trailer, the second image being comprised of an area behind the trailer; defining an obstructed viewing region within the first image, the obstructed viewing region being a region within the first image that includes the trailer; determining an image overlay area within the obstructed viewing region; inserting the second image on the first image according to the image overlay area; rendering graphics in a patch region within the obstructed viewing region and outside the image overlay area, wherein the graphics include natural scene graphics that depict or attempt to depict an area within the obstructed viewing region and outside the second image; and displaying a combined image on an electronic display that is installed in the vehicle, wherein the combined image includes at least part of the first image, at least part of the second image, and the rendered graphics.

According to various embodiments, this method may further include any one of the following features or any technically-feasible combination of these features:

the method is at least partly carried out by an onboard computer installed in the vehicle, wherein the onboard computer carries out the defining step, the determining step, the inserting step, and the rendering step;
 the step of receiving the first image and the second image at the onboard computer, wherein the second image is received via a vehicle-trailer interface;
 a plurality of iterations of the method are carried out including a first iteration and a second iteration, wherein one or more steps of the first iteration are carried out after one or more steps of the second iteration, wherein the first iteration is completed before the second iteration;
 a plurality of iterations of the method are carried out including a first iteration and a second iteration, wherein the first iteration includes retaining at least a portion of the first image in memory of the onboard computer during the a first iteration, and wherein the rendering step of the second iteration includes using the retained portion of the first image to render the graphics of the second iteration;

the second iteration further comprises the step of obtaining a speed of the vehicle, and wherein the rendering step of the second iteration is at least partially based on the obtained speed of the vehicle; and/or the step of overlaying graphics on the combined image that direct or attempt to direct a vehicle operator's or a vehicle passenger's attention to a roadway feature.

According to yet another embodiment, there is provided a vehicle rearview vision system for use with a vehicle, including: a vehicle camera installed on the vehicle, wherein the vehicle camera is configured to capture an area behind the vehicle; an electronic display installed on the vehicle; an onboard computer installed on the vehicle, wherein the onboard computer includes a processor and a non-transitory computer-readable memory, wherein the memory includes a computer program product that, when executed by the processor, causes the vehicle to carry out a combined image generation process that includes: obtaining a first image from the vehicle camera, the first image being comprised of the area behind the vehicle; obtaining a second image from a trailer camera that is installed on a trailer being towed by the vehicle, the second image being comprised of an area behind the trailer; determining an obstructed viewing region within the first image, the obstructed viewing region being a region of the first image in which the trailer resides; overlaying the second image on the first image and at least partially within the obstructed viewing region; inserting graphics in a patch region within the obstructed viewing region and between the second image and the first image; and displaying a combined image on the electronic display, wherein the combined image includes at least part of the first image, at least part of the second image, and the inserted graphics.

According to various embodiments, this system may further include any one of the following features or any technically-feasible combination of these features:
- a vehicle wheel speed sensor, and wherein some of the graphics are generated based on a vehicle wheel speed reading from the vehicle wheel speed sensors;
- the memory includes image recognition software that enables the onboard computer to identify roadway features and, wherein the image recognition software is used in conjunction with the computer program product to render graphics for display in regions of the combined image corresponding to the identified roadway features; and/or
- the computer program product, when executed by the processor, further causes the vehicle to retain at least a portion of the first image in memory of the onboard computer during a first iteration of the combined image generation process, and wherein the rendering step of a second iteration of the combined image generation process includes using the retained portion of the first image to render the graphics of the second iteration.

DRAWINGS

Preferred exemplary embodiments will hereinafter be described in conjunction with the appended drawings, wherein like designations denote like elements, and wherein.

DESCRIPTION

The systems and method described herein are generally designed to generate a combined rearview image of an area behind a vehicle that is towing a trailer. The combined rearview image is an image that includes at least part of a first image captured by a vehicle camera, at least part of a second image captured by a trailer camera, and one or more graphics. It should be appreciated that while certain areas or regions of the combined rearview image may still be obstructed by one or more objects, the combined rearview image described herein substantially mitigates or reduces the amount of obstruction caused by the trailer that the vehicle is towing. In one embodiment, a method can be used to capture a first image from a vehicle camera and to capture a second image from a trailer camera. Thereafter, the method can determine an obstructed viewing region within the first image that the trailer is obstructing and, then, the second image can be inserted into an appropriate area within the obstructed viewing region area. Thereafter, portions of the obstructed viewing region that are not covered by the second image can be filled in by using scene memorization techniques, which will be described in more detail below. Additionally, graphics can be generated and displayed over the image so as to augment the image. These graphics can highlight roadway features, such as lane markers, curbs, and the edges of the roadway.

In some embodiments, the method may take into account scenarios where the articulation angle of the trailer is non-zero such that the longitudinal axes of the trailer and the vehicle are not aligned with one another. For example, the method can include determining an articulation angle of the trailer with respect to the vehicle using readings from various vehicle sensors as well as image processing techniques that are carried out on the image received from the vehicle camera. Once the articulation angle is determined, the vehicle may determine where to place the image that was captured by the trailer camera within the first image that was captured by the vehicle.

Also, in some embodiments, graphics can be generated and displayed over the combined image (i.e., the final image including the first image from the vehicle camera with the second image from the trailer camera superimposed over the first image) to show roadway features, including curbs, lane markers, and edges of the roadway. These graphics can be used to supplement the combined image and can be generated during various embodiments of the method provided herein.

Figure 1:
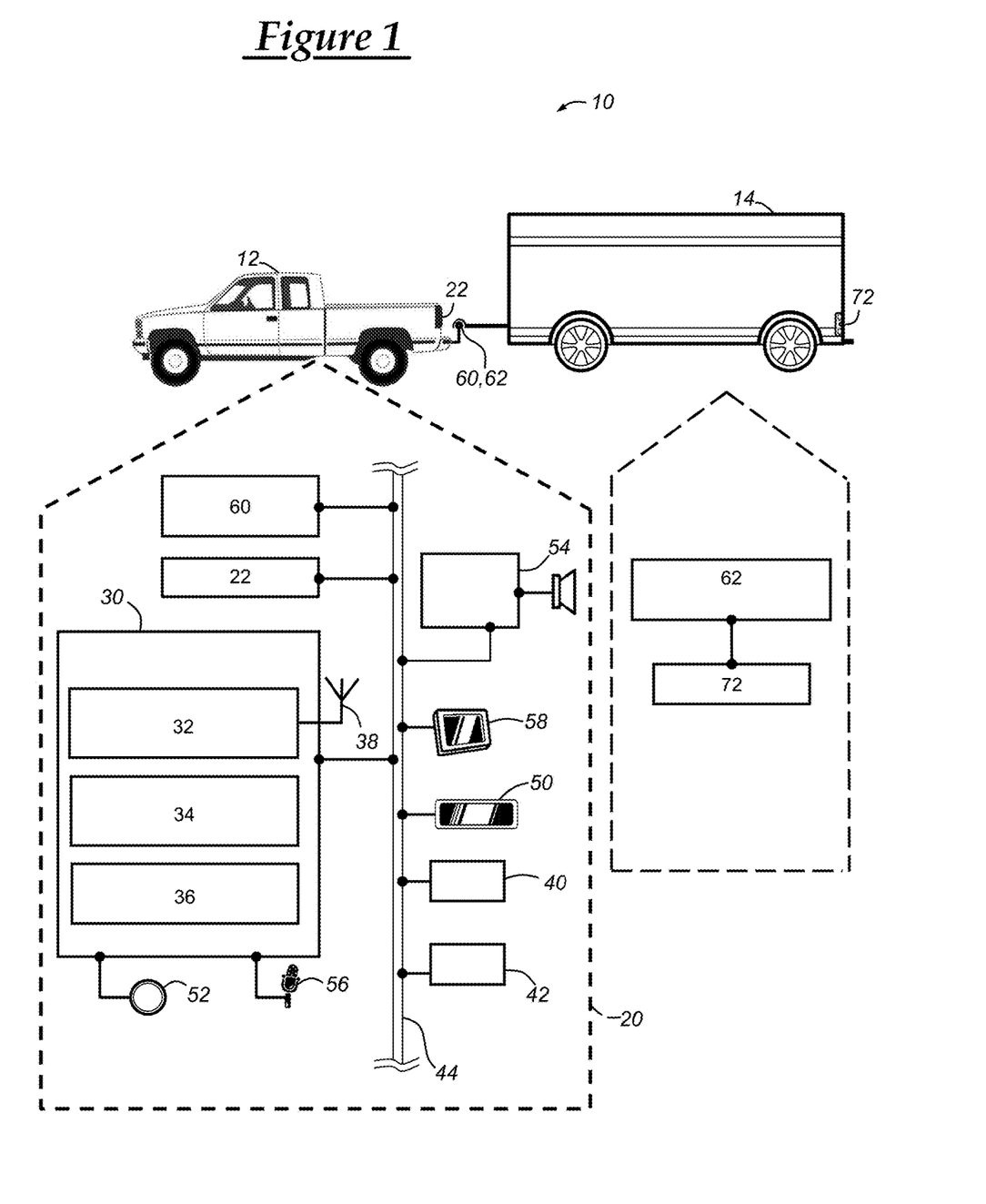
FIG. 1 is a block diagram depicting an example of systems that may be used with a vehicle and a trailer.

With reference to FIG. 1, there is shown a potential embodiment of a vehicle rearview vision system 10 for use with a vehicle and a trailer. Vehicle rearview vision system 10 includes a vehicle 12, trailer 14, and one or more vehicle-trailer interfaces (or connectors) 60,62. The vehicle and trailer are electrically coupled to one another via the vehicle-trailer interfaces (or connectors) 60,62, and are structurally or mechanically coupled to another via a trailer hitch. The vehicle includes vehicle hardware 20 and the trailer includes trailer hardware 70.

Vehicle 12 is depicted as a passenger car, but it should be appreciated that the present method and system may be implemented with other vehicles including motorcycles, trucks (including semi-trucks), sports utility vehicles (SUVs), recreational vehicles (RVs), marine vessels, aircrafts, trains, etc. Some components of vehicle hardware 20 that are more relevant to the present systems and method are shown in FIG. 1, although skilled artisans will appreciate that a much more extensive collection of vehicle hardware exists in most modern vehicles. The vehicle hardware 20 may include a vehicle camera 22, an onboard computer 30, a body control module (BCM) 40, an electronic display mirror 50, and a first vehicle-trailer interface connector 60. It should also be appreciated that the vehicle hardware 20 shown in FIG. 1 is only for purposes of illustration, as the actual arrangement or configuration of components, devices, modules and/or systems could vary substantially from that shown here and it is not limited to any particular embodiment.

Vehicle camera 22 can be used to capture photographs, videos, and/or other information pertaining to light. Camera 22 can be an electronic digital camera that is powered through use of a vehicle battery. Camera 22 may include a memory device and a processing device to store and/or process data that it captures or otherwise obtains. The data obtained by the camera 22 may be sent to another vehicle system module (VSM) such as the on-board computer 30 of the vehicle. Camera 22 may be of any suitable camera type (e.g., charge coupled device (CCD), complementary metal oxide semiconductor (CMOS), etc.) and may have any suitable lens so that it is not limited to any particular type, brand, or model. According to one possibility, camera 22 provides video data where the images are horizontally flipped (i.e., they are the mirror image of the video originally captured by the camera). The horizontally flipped video data accounts for the fact that camera 22 and the driver are facing opposite directions thereby allowing presentation of the video data on the electronic display mirror 50 in an orientation that is consistent with a traditional rear view mirror. Some non-limiting examples of potential embodiments or features that may be used with camera 22 include: infrared LEDs for night vision; wide angle or fish eye lenses; surface mount, flush mount, license mount, or side mount cameras; stereoscopic arrangements with multiple cameras; cameras integrated into tail lights, brake lights, or other components at the rear end of the vehicle; and wired or wireless cameras, to cite a few possibilities.

Camera 22 can be installed and/or mounted on vehicle 12 and may be configured to face in a rearward direction with respect to the vehicle such that the camera can capture an area located behind the vehicle—that is, the field of view of the camera may include an area behind the vehicle and, in many embodiments, a trailer that is being towed by vehicle 12 may occupy at least a portion of the field of view of the camera. According to a particular embodiment, camera 22 can be mounted on a rear exterior portion of vehicle 12 and, in some embodiments, camera 22 may be a backup camera (or reversing camera) that is already included as a part of many consumer vehicles, including cars and trucks, or that may be required by one or more laws or regulations, including those regulations of the National Highway Traffic Safety Administration (NHTSA) that requires certain vehicles to include a backup camera. In one embodiment, the camera 22 may be mounted on or embedded within a rear bumper of vehicle 12, a trunk or other rear door of vehicle 12, a tailgate (including those included in pickup trucks) of vehicle 12, a spoiler of vehicle 12, and/or any other location on vehicle 12 that is suitable for mounting or embedding camera 22 such that the field of view includes an area behind vehicle 12.

In some embodiments, multiple cameras 22 can be used, each of which can be mounted and/or installed on vehicle 12. In one particular embodiment, multiple cameras can be positioned on the exterior of the vehicle and facing in the rearward direction of the vehicle. Two or more cameras may be configured in a stereoscopic orientation such that video data is provided from multiple perspectives of an area and, when combined and processed according to a three-dimensional rendering algorithm, a three-dimensional reconstruction of the area (e.g., the area behind the trailer) may be rendered. This rendering may then be displayed on a visual display, such as visual display 58 or electronic display mirror 50. A stereoscopic orientation refers to an orientation of multiple cameras such that their fields of view overlap thereby allowing multiple perspectives of the area to which their respective fields of view overlap.

Onboard computer 30 is a vehicle system module that includes a processor 34 and memory 36 and, in some embodiments, can also include a wireless chipset or circuitry 32 that enables wireless communications to be carried out with, for example, a cellular carrier system or another local wireless device. Additionally, at least in some embodiments, onboard computer 30 can be an infotainment unit (e.g., infotainment head unit, in-car entertainment (ICE) unit, in-vehicle infotainment (IVI)), a vehicle head unit, a center stack module (CSM), or vehicle navigation module. In some embodiments, onboard computer 30 may include one or more vehicle-user interfaces including pushbutton 52 and/or microphone 56, as discussed more below.

Processor 34 can be any type of device capable of processing electronic instructions including microprocessors, microcontrollers, host processors, controllers, vehicle communication processors, and application specific integrated circuits (ASICs). It can be a dedicated processor used only for onboard computer 30 or can be shared with other vehicle systems. Processor 34 executes various types of digitally-stored instructions, such as software or firmware programs stored in memory 36, which enable the computer 30 to provide a wide variety of services. For instance, processor 34 can execute programs or process data to carry out at least a part of the method discussed herein. Memory 36 may include RAM, other temporary powered memory, any non-transitory computer-readable medium (e.g., EEPROM), or any other electronic computer medium that stores some or all of the software needed to carry out the various external device functions discussed herein.

As mentioned above, onboard computer 30 may include a wireless chipset or circuitry 32 that can be used to carry out wireless communications using antenna 38. In one embodiment, wireless chipset 32 is a cellular chipset that is configured to carry out cellular communications using a cellular carrier system, such as those that may implement GSM/GPRS technology, CDMA or CDMA2000 technology, LTE technology, etc. Additionally, or alternatively, onboard computer 30 may include a short-range wireless communications (SRWC) circuit that enables SRWC to be carried out using SRWC technologies including Wi-Fi™, WiMAX™, ZigBee™, Wi-Fi Direct™, other IEEE 802.11 protocol, Bluetooth™, Bluetooth™ Low Energy (BLE), or near field communication (NFC). In other embodiments, wireless communications may be carried out at another vehicle system module (VSM) that is connected to bus 44.

Body control module (BCM) 40 is shown in the exemplary embodiment of FIG. 1 as being electrically coupled to communication bus 44. In some embodiments, the BCM 40 may be integrated with or part of a center stack module (CSM) and/or integrated with onboard computer 30. Or, the BCM may be a separate device that is connected to one another via bus 44. BCM 40 can include a processor and/or memory, which can be similar to processor 34 and memory 36 of onboard computer 30, as discussed above. BCM 40 may communicate with onboard computer 30 and/or one or more vehicle system modules, such as audio system 54 or other VSMs 42. BCM 40 may include a processor and memory such that the BCM may direct one or more vehicle operations including, for example, controlling central locking, air conditioning, power mirrors, controlling the vehicle primary mover (e.g., engine, primary propulsion system), and/or controlling various other vehicle modules. BCM 40 may receive data from onboard computer 30 and, subsequently, send the data to one or more vehicle modules.

Additionally, BCM 40 may provide information corresponding to the vehicle state or of certain vehicle components or systems. For example, the BCM may provide the onboard computer 30 with information indicating whether the vehicle's ignition is turned on, the gear the vehicle is presently in (i.e. gear state), and/or other information regarding the vehicle. In one embodiment, the method 200 (FIG. 6) may be initiated upon one or more vehicle states, such as a vehicle ignition on condition (i.e., a vehicle state where the ignition is turned on). And, in some embodiments, the method may use vehicle state information for carrying out one or more steps. In such embodiments, the BCM 40 may obtain and send information to onboard computer 30, including vehicle speed, trailer articulation angle, steering wheel angle, and various other information that may be obtained from other VSMs or sensors installed on the vehicle. In some embodiments, a trailer articulation angle can be determined or measured using various vehicle sensors and, at least in one embodiment, the vehicle may include a sensor that is specifically adapted or configured to measure the trailer articulation angle.

Electronic display mirror 50 includes a video display integrated into the rear view mirror unit or housing so that the display shows the driver the video output from the vehicle camera 22 and/or trailer camera 72 in real time. According to the exemplary embodiment of FIG. 1, the electronic display mirror 50 is communicatively coupled to and receives images and/or video from onboard computer 30. In one embodiment, the electronic display mirror 50 may be directly wired to onboard computer 30 or may be connected to onboard computer 30 via bus 44. The electronic display mirror may utilize any number of different display technologies, such as a liquid crystal display (LCD) or a light emitting diode (LED) display. It should be appreciated that the system and method described herein may use any suitable type of electronic display mirror 50 and are not limited to any particular one. For instance, the electronic display mirror 50 may be a full display mirror (FDM) where the entire viewable surface of the device shows video from camera 22 and/or camera 72; it may be the type of electronic display mirror where only a portion of the display surface shows video from camera 22 and/or camera 72, whereas other portions of the display surface show other information (e.g., turn-by-turn or other navigation instructions, a compass or heading information, host vehicle performance data, etc.); it could have daytime and nighttime modes that adjust the brightness accordingly; or it could have a touchscreen so that users can make selections or otherwise input data, to cite a few of the possibilities. Instead of the electronic display mirror 50 being positioned in the traditional location of a rear view mirror (i.e., mounted to the front windshield at an upper, center location), it is possible for it to be part of onboard computer 30, other center console infotainment unit, or other VSM.

Vehicle hardware 20 also includes a number of vehicle user interfaces that provide vehicle occupants with a means of providing and/or receiving information, including pushbutton(s) 52, audio system 54, microphone 56, and visual display 58. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the onboard computer 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module and/or onboard computer 30. Microphone 56 provides audio input to the onboard computer 30 to enable the driver or other occupant to provide voice commands and/or carry out hands-free calling via a wireless carrier system. For this purpose, it can be connected to an on-board automated voice processing unit utilizing human-machine interface (HMI) technology. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Any of the devices 22-62 may be stand-alone, as illustrated in FIG. 1, or they may be incorporated or included within some other device, unit or module. Furthermore, any of the devices 22-62 may be dedicated or they may be part of or shared by other systems or sub-systems in the vehicle. For example, the enhanced video output from onboard computer 30 may be directly or indirectly provided to the electronic display mirror 34. Accordingly, the devices 22-62 are not limited to the schematic representation in FIG. 1 or the exemplary descriptions above, nor are they limited to any particular embodiment or arrangement so long as they can be used with the method described herein.

Trailer 14 is depicted as a storage trailer, but it should be appreciated that the present systems and method may be implemented with other trailers including boat trailers, livestock trailers, semi-trailers, motorcycle trailers, popup camper trailers, pusher trailers, travel trailers, fifth wheels, etc. Some components of trailer hardware 70 that are more relevant to the present systems and method are shown in FIG. 1, although skilled artisans will appreciate that a much more extensive collection of trailer hardware exists in modern trailers. Trailer 14 can include a frame 80 that provides structural support, as well as certain trailer frame components 82,84 that can be used by vehicle 12 to determine a trailer articulation angle, as discussed more below. The trailer 14 may also include one or more cameras 72 and a vehicle-trailer interface 62. It should also be appreciated that the trailer hardware 70 shown in FIG. 1 is only for purposes of illustration, as the actual arrangement or configuration of components, devices, modules and/or systems could vary substantially from that shown here and it is not limited to any particular embodiment. In another embodiment, a second trailer may be attached to trailer 14 via an interface similar to the vehicle-trailer interface such that the vehicle may communicate with the second trailer via a trailer-trailer interface (which may be similar or the same in construction as the vehicle-trailer interface). Additional trailers may be attached and communicated with by the vehicle or other trailers in a like arrangement.

Trailer camera 72 can be used to capture photographs, videos, and/or other information pertaining to light. Camera 72 can be an electronic digital camera that is powered through use of a vehicle battery. Camera 72 may include a memory device and a processing device to store and/or process data that it captures or otherwise obtains. The data obtained by the camera 72 may be sent to a module located on vehicle 12 such as on-board computer 30. Camera 72 may be of any suitable camera type (e.g., charge coupled device (CCD), complementary metal oxide semiconductor (CMOS), etc.) and may have any suitable lens so that it is not limited to any particular type, brand, or model. According to one possibility, camera 72 provides video data where the images are horizontally flipped (i.e., they are the mirror image of the video originally captured by the camera). Some non-limiting examples of potential embodiments or features that may be used with camera 72 include: infrared LEDs for night vision; wide angle or fish eye lenses; surface mount, flush mount, license mount, or side mount cameras; stereoscopic arrangements with multiple cameras; cameras integrated into tail lights, brake lights, or other components at the rear end of the trailer; and wired or wireless cameras, to cite a few possibilities.

Camera 72 can be installed and/or mounted on trailer 14 and may be configured to face in a rearward direction with respect to the trailer such that the trailer camera can capture an area located behind the trailer—that is, the field of view of the trailer camera may include an area behind the trailer and, in many embodiments, the images or video captured by trailer camera 72 can be used to supplement images or video captured by vehicle camera 22. In one embodiment, the images or video captured by trailer camera 72 can be incorporated into images or video captured by vehicle camera 22 in an obstructed viewing region. For example, trailer 14 may obstruct a region of the image captured by vehicle camera 22 (i.e., the obstructed viewing region) and, thus, this obstructed region can be supplemented by combining images or video from trailer camera 72 into the obstructed viewing region contained within those images or video from vehicle camera 22. In this way, images or video from vehicle camera 22 and trailer camera 72 can be used together and integrated with one another so as to provide an unobstructed rear view that can be displayed on electronic display mirror 50 for viewing by a vehicle operator or passenger.

According to a particular embodiment, trailer camera 72 can be mounted on a rear exterior portion of trailer 14 and, in some embodiments, trailer camera 72 may be a backup camera (or reversing camera) that is already included as a part of some consumer trailers. In one embodiment, the camera 72 may be mounted on or embedded within a rear bumper of trailer 14, a trunk or other rear door of trailer 14, and/or any other location on trailer 14 that is suitable for mounting or embedding camera 72 such that the field of view includes an area behind trailer 14. In other embodiments, camera 72 may be mounted or installed on a side of trailer 14 and facing a blind spot area that cannot easily be viewed by a vehicle operator or which may be mounted or installed on a location of trailer 14 such that the field of view of camera 72 captures images or video of an area constituting at least a portion of the obstructed viewing region as discussed above. In some embodiments, multiple cameras 72 can be used, each of which can be mounted and/or installed on trailer 14. In one particular embodiment, multiple cameras can each be positioned on opposite sides of the exterior of the trailer so as to face one or more blind spot areas (i.e., areas in which a vehicle operator cannot easily view). In other embodiments, the multiple cameras may be mounted and/or installed on trailer 14 such that the cameras face in the rearward direction of the trailer. Two or more cameras may be configured in a stereoscopic orientation such that as that which is discussed above with respect to vehicle camera 22.

Vehicle-trailer interface connectors 60 (vehicle-side) and 62 (trailer-side) may be used to connect the trailer hardware 70 to electric power provided by the vehicle and/or to provide communications between trailer hardware 70 and vehicle hardware 20. In one embodiment, a standard 7-pin SAE J560 compliant interface can be used to connect the trailer hardware 70 to power from a vehicle battery. In many embodiments, the vehicle-trailer interface can include a dedicated line for communications and, in other embodiments, trailer hardware 70 may include wireless circuitry that can be used to carry out wireless communications with onboard computer 30 via use of wireless chipset 32. In either wireline or wireless embodiments, the vehicle and trailer may communicate in a bidirectional manner. Such wireless communications may include any of those SRWC technologies discussed above, such as any of the IEEE 802.11 protocols or any of the Bluetooth™ protocols. In other embodiments, power line communication techniques can be used to modulate data over one or more power lines connecting vehicle 12 and trailer 14. Those skilled in the art will appreciate other potential vehicle-trailer communication means that may be integrated into vehicle hardware 20 and/or trailer hardware 70.

The vehicle-trailer interface can include two connectors, a vehicle-side connector 60 and a trailer-side connector 62 that fit together in a complementary fashion. In one embodiment, vehicle-side interface connector 60 which is included in vehicle hardware 20 includes one or more female and/or male pins. Accordingly, trailer-side interface connector 62 which is included in trailer hardware 70 includes complementary male and/or female pins such that they complement vehicle-side interface connector 60 pins.

Figure 2:
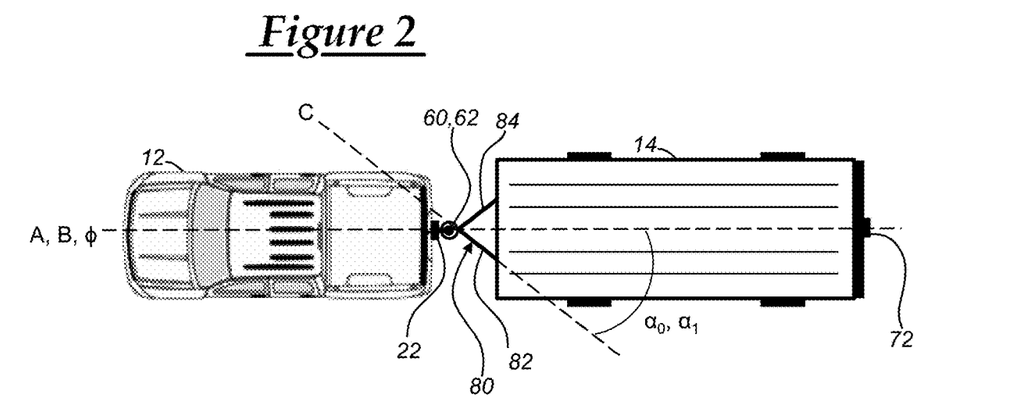
FIG. 2 is a top view of a vehicle and a trailer, where the articulation angle of the trailer is zero.
Figure 3:
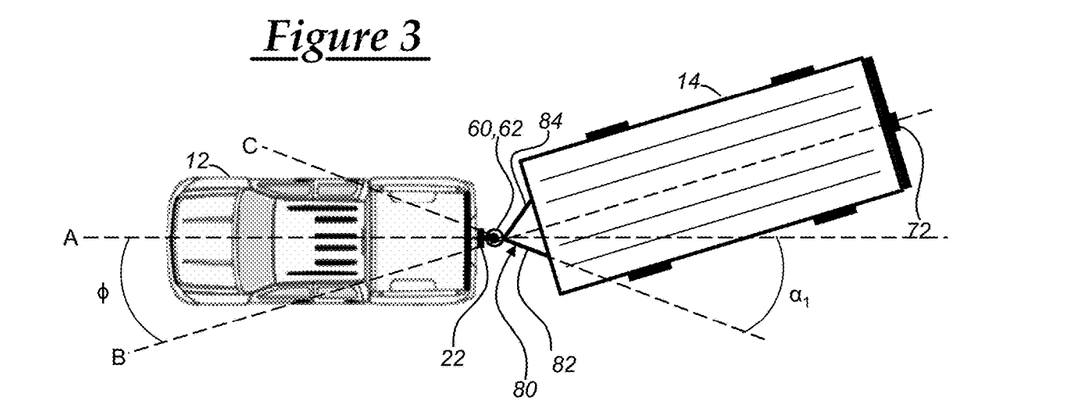
FIG. 3 is a top view of a vehicle and a trailer, where the articulation angle of the trailer is non-zero.

With reference to FIGS. 2 and 3, there is provided top views of a vehicle and a trailer, where the articulation angle of the trailer is zero (FIG. 2) and nonzero (FIG. 3). FIGS. 2 and 3 can be used as a reference to supplement the discussion of method 200 (FIG. 6), which is discussed below. As illustrated in FIGS. 2 and 3, reference line A illustrates a longitudinal central axis of vehicle 12, reference line B illustrates a longitudinal central axis of trailer 14, and reference line C illustrates an axis of a frame component 82,84 of trailer 14. As discussed more below, certain angles may be calculated using these reference points to provide a trailer articulation angle that can be used in various embodiments of method 200 (FIG. 6).

As shown in FIG. 2, there is shown a scenario where vehicle 12 and trailer 14 are aligned with one another such that the present articulation angle φ of the trailer with respect to the vehicle is zero. The articulation angle can be measured from reference line A and reference line B such that the articulation angle represents an angle between the central longitudinal axis of vehicle 12 and the central longitudinal axis of trailer 14. In some embodiments, other reference lines or axes can be used to calculate the articulation angle φ. For example, the vehicle can use rear-facing vehicle camera 22 to determine the articulation angle φ based on one or more objects within the field of view of camera 22, including a trailer frame component 82 or 84. As shown in FIG. 2, reference line C, which corresponds to an axis of trailer frame component 82, and reference line A are used to calculate a first reference angle $\alpha_1$ that can be used with a predetermined or predefined reference angle $\alpha_0$ to determine an articulation angle φ. For example, vehicle camera 22 can be used to capture images of trailer frame component 82 and, thereafter, can use image processing techniques to determine a first reference angle $\alpha_1$. This angle can then be compared to a predetermined or predefined reference angle $\alpha_0$, which can be an angle between reference line C and reference line A when the longitudinal vehicle axis (represented by reference line A) and the longitudinal trailer axis (represented by reference line B) are aligned, as depicted in FIG. 2. In some embodiments, the first reference angle $\alpha_1$ can be subtracted from the predetermined reference angle $\alpha_0$ to obtain the articulation angle φ. The articulation angle φ can be used in various steps of method 200, which is discussed below.

Figure 4:
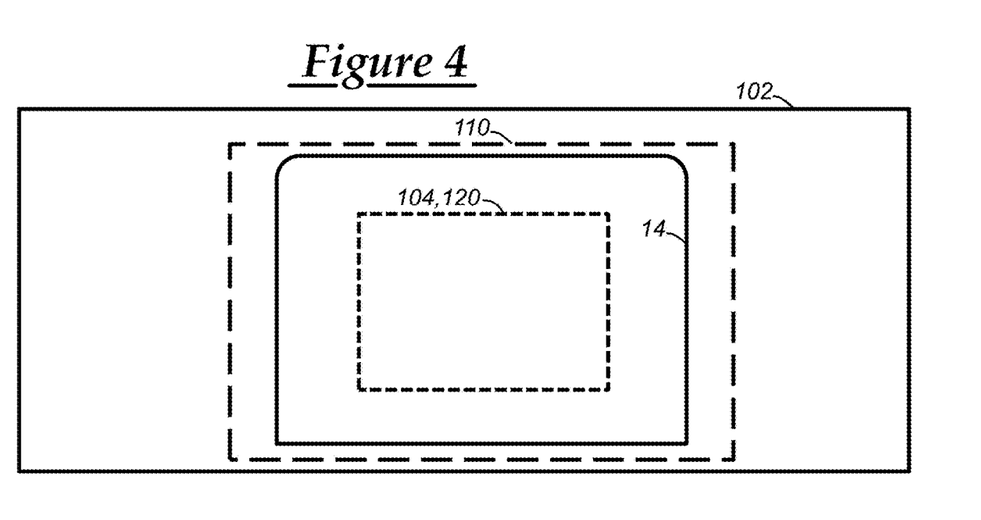
FIG. 4 is a schematic view of a display on an electronic display mirror showing a perspective of a vehicle camera when the trailer articulation angle is zero.
Figure 5:
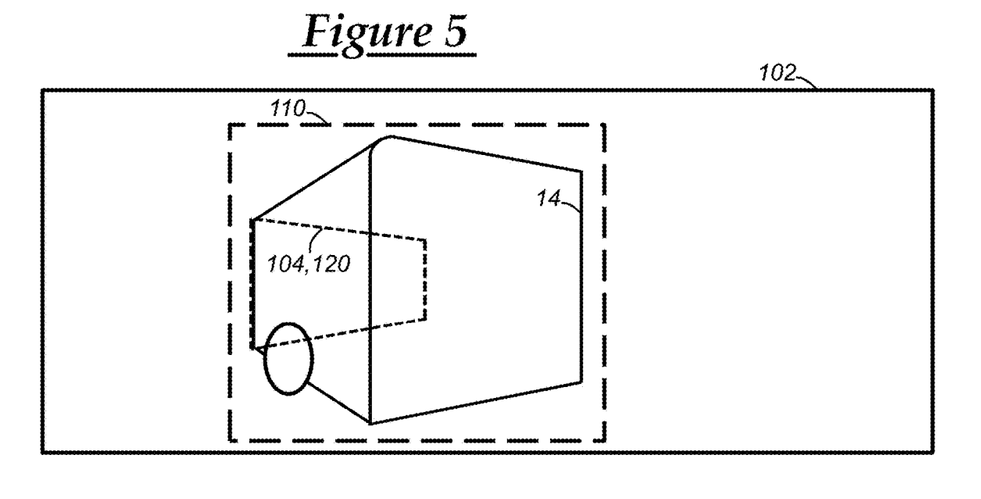
FIG. 5 is a schematic view of a display on an electronic display mirror showing the perspective of a vehicle camera when the trailer articulation angle is non-zero.

With reference to FIGS. 4 and 5, there is shown examples of a view taken from vehicle camera 22 during the scenarios presented in FIG. 2 and FIG. 3, respectively. These views illustrate a first image 102, a second image 104, an obstructed viewing region 110, and an image overlay area 120. FIG. 4 shows trailer 14 straight on as would be captured by vehicle camera 22 in a scenario where the trailer articulation angle φ is 0° (FIG. 2) and FIG. 5 shows trailer 14 at an angle as would be captured by vehicle camera 22 in a scenario where the trailer articulation angle φ is non-zero (FIG. 3). When describing method 200 (FIG. 6) below, reference to FIGS. 2-5 is made for purposes of illustration.

Figure 6:
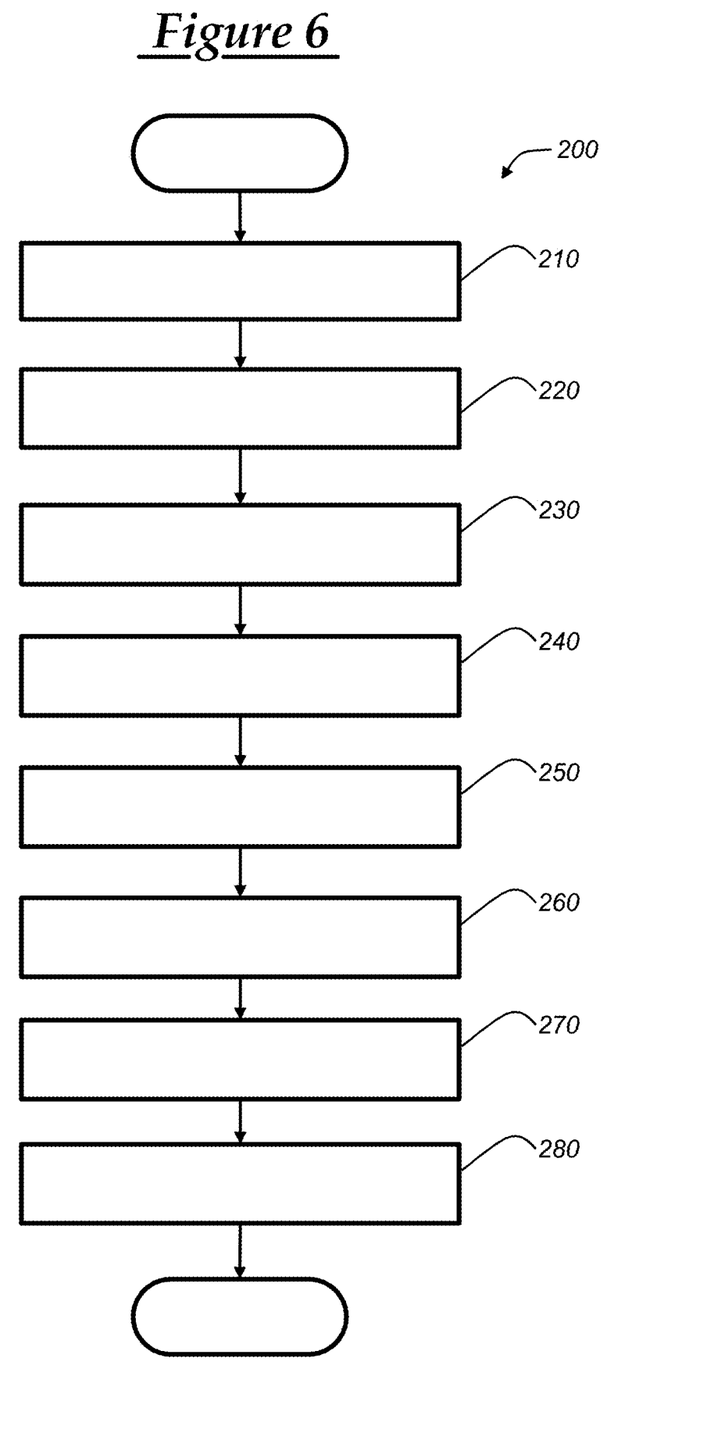
FIG. 6 is a flowchart illustrating embodiments of a method of generating a combined rearview image of an area behind a vehicle that is towing a trailer.

With reference to FIG. 6, there is provided a method 200 of generating a combined rearview image of an area behind a vehicle that is towing a trailer. The method 200 generally includes the steps of capturing images (or video) from vehicle camera 22 and trailer camera 72, determining an obstructed viewing region with the images (or video) from vehicle camera 22, superimposing the images (or video) from trailer camera 72 over at least part of the obstructed viewing region, and applying scene memorization techniques to fill the area of the obstructed viewing region that was not supplemented by the images (or video) from trailer camera 72. Other embodiments include augmenting the finished or combined rearview image (or video) with graphics that, for example, can highlight roadway features.

In many embodiments, method 200 can be implemented in a computer program product (or "application") embodied in a computer readable medium and including instructions usable by one or more processors of one or more computers of one or more systems. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, such as memory 36, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method, including the electronic devices that are a part of the vehicle hardware 20 and/or the trailer hardware 70.

Method 200 begins with step 210, wherein a first image from a vehicle camera that is installed on the vehicle is captured. In many embodiments, the first image can be comprised of an area behind the vehicle. And, in other embodiments, multiple vehicle cameras can be used, such as camera facing a left blind spot and another camera facing a right blind spot. The images or video captured by camera 22 can then be sent to onboard computer 30 via communications bus 44. The onboard computer 30 obtains this image/video input and then may, for example, store, buffer, process and/or pass the video to the electronic display mirror 50, as will be described below. The method 200 continues to step 220.

In step 220, a second image from a trailer camera that is installed on the trailer is captured. In some embodiments, the second image can be comprised of an area behind the trailer, such as an area within the obstructed viewing region of the first image. The second image can be captured by trailer camera 72 and then communicated to onboard computer 30 of vehicle 12. The images can be sent to onboard computer via a wired connection that runs from the trailer to the vehicle via the vehicle-trailer interface connectors 60,62. In other embodiments, the images or video from trailer camera 72 can be sent wirelessly using a SRWC chipset or circuitry at the trailer and vehicle. The onboard computer 30 obtains the second image input and then may, for example, store, buffer, process and/or pass the video to the electronic display mirror 50, as will be described below. The method 200 continues to step 230.

In step 230, the second image is processed and/or manipulated such that the second image reflects a viewing angle that corresponds to the first image. For example, in some embodiments, the vehicle camera 22 and the trailer camera 72 may be oriented at different angles with respect to an area behind the vehicle or trailer and, thus, prior to incorporating the second image into a region of the first image, it may, at least in some embodiments, prove beneficial to determine a viewing angle that corresponds to the first image so that the second image can be processed and/or manipulated in a manner so as to depict an area behind the trailer according to the determined viewing angle. The viewing angle can be determined using various methods, including using predetermined or predefined viewing angle values that are associated with the vehicle camera 22 and the trailer camera 72. In other embodiments, the first image can be processed and/or manipulated so that the first image reflects a viewing angle that corresponds to the second image. Moreover, in at least one embodiment, both the first and the second image can be processed and/or manipulated so that the resultant image reflects a viewing image from the perspective of an angle of interest.

For example, the vehicle may be provisioned or programmed with information concerning the viewing angle of the vehicle camera 22. Additionally, the vehicle may obtain the viewing angle of the trailer camera 72 by, for example, retrieving trailer information concerning the model of trailer 14 from a trailer information database. The trailer information database can be stored at a remote location, such as a remote server that is accessible over the Internet. In such a case, vehicle 12 can retrieve the trailer information (that includes information pertaining to the trailer camera viewing angle) and can then store this information in memory, such as memory 34. In other embodiments, certain trailer information may be known to trailer 14 and sent to onboard computer 30 of vehicle 12. Or, in other embodiments, vehicle 12 may include a trailer information database, such as in memory 36. Other examples of determining or obtaining the angle of the trailer camera can be by means of the driver entering that information to the system, or the system automatically learning the angle of the camera based on an algorithm where the driver is instructed to drive for a short period of a time while the camera learns its position. And, in another embodiment, the system can determine this angle by prompting an operator to place certain pre-defined shapes in certain locations in the field of view (FOV) of the camera and, then, prompting the camera to learn its location and viewing angle based on the location of the pre-defined shapes. Once the trailer camera viewing angle is obtained, the vehicle can also obtain the vehicle camera viewing angle. This angle can be obtained from a vehicle information database that stores information pertaining to the vehicle. The onboard computer 30 can obtain this information from a remote server, from memory 36, and/or from another VSM of vehicle 12.

Once the trailer camera viewing angle and the vehicle camera viewing angle are obtained at onboard computer 30, the second image (from the trailer camera 72) can be processed or manipulated accordingly. For example, certain areas of the second image may need to be distorted so as to reflect an image that corresponds to the viewing angle of the vehicle camera 22. Various techniques can be used to distort or transform the second image. And, in some embodiments, the first image can be processed according to the viewing angles as well. As mentioned above, images corresponding to other viewing angles may be used and, in such embodiments, the method can be carried out accordingly as will be appreciated by those skilled in the art. Once the second image is processed according to the trailer camera viewing angle and/or the vehicle camera viewing angle, then the method 200 proceeds to step 240.

In step 240, an obstructed viewing region within the first image is determined. In many embodiments, the obstructed viewing region is a region of the first image in which the trailer resides or occupies. For example, in FIG. 4, the trailer 14 is obstructing at least part of region 110 and, in FIG. 5, the trailer 14, which is articulated at an angle $\phi$, is obstructing much of the left side of the first image 102. The obstructed viewing region can thus be dynamically determined based on various factors including the articulation angle of the trailer 14, the steering wheel angle of vehicle 12, the identification of the trailer 14 within the first image using image processing techniques, and various other information. Moreover, the obstructed viewing region can include other areas of the first image that are not obstructed and/or that surround a region of the first image in which the trailer resides. In this way, these areas surrounding the trailer 14 within the first image can be removed so as to allow a smoother or more natural transition between the first and second image, which is inserted into the first image, as discussed below (step 250).

The obstructed viewing region can be defined by two or more coordinates that correspond to locations within the first image. The coordinate system can be based on the resolution of the first image and can be defined using indices (coordinate pairs) corresponding to a pixel within the first image. In one embodiment, the obstructed viewing region can be defined by four coordinates that represent vertices of a quadrangle (e.g., a rectangle). In other embodiments, other processes can be used to define the obstructed viewing region within the first image.

The obstructed viewing region can be statically defined or dynamically defined. In one embodiment, memory 36 of computer 30 can store a predefined obstructed viewing region definition (e.g., four coordinates defining the obstructed viewing region) that corresponds to an area that is obstructed by the trailer when the articulation angle $\phi$ is 0° (zero degrees) and the vehicle and trailer are on a leveled surface. The predefined obstructed viewing region definition can then be modified in light of a present articulation angle $\phi$ of the trailer, image processing techniques performed on the first image and/or the second image, the distance between the trailer and the vehicle, a steering wheel angle, one or more other vehicle or trailer states as determined by vehicle hardware 20 or trailer hardware 70, and/or a variety of other information (e.g., trailer width and height). The vehicle can obtain this information, such as the distance between the trailer and the vehicle, by downloading this content from a remote facility or by being preconfigured or programmed with the information, which can be stored in memory 36. Or, the vehicle can use backup sensors to obtain a distance between the trailer and the vehicle.

The articulation angle can be used to adjust the obstructed viewing region definition since, depending on the articulation angle $\phi$, the trailer may obstruct different regions of the first image. And, in many embodiments, the length of the trailer can be used to adjust the obstructed viewing region definition, as that can play a significant role in ascertaining the boundaries of the obstructed viewing region. For example, if the trailer is articulated to the right (reference angle $\alpha_1$ is less than the predetermined reference angle $\alpha_0$), then the left side of the first image from the vehicle camera 22 may be obstructed more than the right side of the first image, as shown in FIG. 5. Thus, by obtaining the articulation angle ϕ, the onboard computer may know whether and to what extent certain portions of the first image are being obstructed by the trailer thereby providing the onboard computer with information so as to define a suitable obstructed viewing region. The articulation angle ϕ can be obtained using various methods, such as using image processing techniques on the first image to determine a reference line C corresponding to a trailer frame component 82, 84 and/or using information from BCM 40, including a steering wheel angle.

Additionally, when defining the obstructed viewing region, information regarding the obstructed area and/or other areas that are to be cut out can be derived from using image processing techniques on the first image and/or the second image. For example, the trailer may be identified by processing the first image using object recognition or pattern recognition techniques, some of which may include the use of predefined or predetermined data that is associated with the trailer 14. These image recognition techniques can be used instead of the articulation angle, or may be used to corroborate one another in defining the obstructed viewing region. Additionally, or alternatively, the vehicle could use already existing proximity sensors in back of the vehicle (i.e., backup sensors) that can use radar (or other techniques) to locate the boundaries of the trailer.

Moreover, the first image and the second image may include regions that represent the same area behind the trailer. For example, both the vehicle camera 22 and the trailer camera 72 may capture an object located to the back-left of the trailer. Thus, in at least some embodiments, it may not be desirable to place the second image within the first image (step 250) wherein both images depict the same object, as this may confuse an operator or passenger of vehicle 12. Thus, image processing techniques (including object recognition techniques) can be used to identify certain objects within the field of view of the vehicle camera 22 and the trailer camera 72. These duplicate regions can then be identified within the first image and can then be included in the obstructed viewing region definition, which will result in these regions being removed from the first image before being displayed for viewing by a vehicle operator or passenger. Once the obstructed viewing region definition is determined and stored in memory 36, the method 200 proceeds to step 250.

In step 250, the second image is overlaid on the first image and within the obstructed viewing region. This step can include determining an image overlay area that corresponds to an area in which the second image will be overlaid on the first image. The image overlay area can be defined using a plurality of coordinates similar to the manner in which the obstructed viewing region is defined. And, in some embodiments, the image overlay area can be the same as the obstructed viewing region—that is, the image overlay area definition can be the same as the obstructed viewing region definition. And, in other embodiments, the image overlay area can be based on the obstructed viewing region definition, or the obstructed viewing region can be based on the image overlay area. And, in many embodiments, the obstructed viewing region may include a portion of the image overlay area and other portion(s) that are not within the image overlay area. These portions of the obstructed viewing region that are outside the image overlay area can be referred to as patch regions and will likely be filled in, as described below.

The image overlay area can be determined using a variety of techniques, some of which can be based on the articulation angle ϕ of the trailer, trailer information (e.g., trailer dimensions such as trailer length), and other information. Object recognition or pattern recognition techniques can be used to align the second image within the first image so as to not create a distorted or inaccurate appearance of objects within the final, combined rearview image. Once the image overlay area is determined, the definition of this area can be stored in memory, such as memory 36, and may be stored along with other information, such as articulation angle ϕ, so that, upon the later occurrence (as a part of a future iteration of method 200) of step 250 during a scenario where the articulation angle ϕ is the same, the image overlay area definition can be recalled from memory 36 as opposed to recalculated. Thereafter, the second image data (e.g., the bytes representing the pixels) can be transposed into the first image data so that an image containing the first image and the second image within the image overlay area is obtained. This image (i.e., the "aggregate image") may then be stored in memory 36. Once the second image is overlaid or inserted into the image overlay position, it could prove useful to shift the second image around and/or adjust its size so that it fills the vacant space in a more life-like way and better integrates the images together. By improving this integration process, there may be less patch region areas that need to be filled in. And, during this integration process, the second image can be resized, scaled, transformed, and/or processed using other image processing techniques so as to integrate the second image into the aggregate image thereby forming a more life-like image. The method 200 continues to step 260.

In step 260, graphics can be added so as to augment the image that is to be displayed to a vehicle operator or passenger. These graphics can highlight or direct a user's attention to certain objects or areas within the image thereby providing the vehicle operator or passenger more awareness of their surroundings. The graphics can correspond to certain objects in the image, which can be identified by using certain image processing techniques (object recognition or pattern recognition techniques). Alternatively or additionally, the graphics can be based on other information received at one or more vehicle sensors at the vehicle, such as information obtained by a lidar or radar, or information obtained from a wireless communications device via a connection with a remote server. For example, the graphics can be a lane change warning that warns a vehicle operator that an object, such as another vehicle, is in a lane adjacent to the vehicle. The graphics can be sized and/or transformed according to the corresponding object to which they are to be applied to. In some embodiments, graphics highlighting lane marker, curbs, and/or edges of the road can be generated and displayed over the image (step 280).

Additionally, the onboard computer can obtain and/or generate graphics for the trailer wheels (i.e., virtual trailer wheel graphics) that can be used to inform a vehicle operator or passenger of where the trailer wheels are relative to the road. The method 200 continues to step 270.

In step 270, graphics can be developed or obtained for use in filling in the patch regions of the aggregate image. A variety of techniques can be used to fill these patch regions, including scene memorization techniques and/or image stitching techniques. In some embodiments, stitching techniques can be used to improve the overall image especially in regions included in or around the image overlay area and/or the obstructed viewing region. These techniques can include adjusting image attributes (e.g., brightness, luminosity, contrast, color curves) as well as selecting to alter individual pixel values.

The patch regions can also be filled through use of scene memorization techniques. Scene memorization refers to retaining certain images for use later in other images that include at least a portion of the area represented by the retained images. For example, the vehicle camera 22 may have an unobstructed view of areas to the sides of trailer 72. Then, as the vehicle moves forward, these areas may then become obstructed by trailer 14. However, at this point, the vehicle can use the retained images to fill in the patch regions that are obstructed by the trailer or that are within the obstructed viewing region—it should be appreciated that the obstructed viewing region may include areas of the first image that are not obstructed by the trailer but that are included so that they will be removed and then patched or stitched thereby providing a better transition between the first and second image.

Scene memorization techniques may be carried out by processor 34 of onboard computer 30. The onboard computer 30 can use various information from one or more vehicle system modules or sensors included on the vehicle, such as BCM 40 and/or a wheel speed sensor. In some embodiments, a vehicle speed may be obtained by the onboard computer 30 from BCM 40 or from one or more wheel speed sensors installed on the vehicle 12. The vehicle speed can be used to determine a rate at which the pixels of the first and second image are moving and, thus, where to insert the retained images within the obstructed viewing region. The method 200 continues to step 280.

In step 280, a combined image is displayed on an electronic display mirror included in the vehicle. In other embodiments, the combined image can be displayed on another display of the vehicle, such as an infotainment unit display or multimedia display. The combined image includes at least a part of the first image captured by the vehicle camera 22, at least part of the second image captured by the trailer camera 72, and one or more graphics. The one or more graphics can be generated to highlight roadway features or to otherwise direct a vehicle operator's or passenger's attention to an object or other information contained within the combined image. Or, the one or more graphics can be graphics that attempt to recreate portions of the area surrounding the vehicle and trailer so as to imitate a view behind the vehicle that is not obstructed by the trailer.

In many embodiments, the combined image can be displayed on electronic display mirror 50. The combined image can be sent to the electronic display mirror 50 via communications bus 44. In other embodiments, the unobstructed final image can be sent to one or more other displays within the vehicle, including display 58. The combined image, or at least portions thereof, can be saved into a non-transitory computer-readable memory (or even a random access memory (RAM)) so that these images may be later recalled for use in carrying out future iterations of the method 200. For example, upon a next iteration of method 200, certain portions of the first image that were not within the obstructed viewing region may be recalled from memory and then used in the next iteration to fill a portion of the obstructed viewing region.

Additionally, it should be appreciated that, although method 200 was discussed with reference to creating a single image, method 200 can be used to create a series of images that can be used to create a video to be displayed on electronic display mirror 50. And, at least in some embodiments, iterations of method 200 may be carried out in a serial or parallel manner—that is, method 200 may be completely carried out before beginning a next iteration of method 200 (serial) or method 200 (or certain steps therein) may be carried out in a parallel manner such that certain steps of a first iteration of method 200 are carried out at the same time as certain steps of a second iteration of method 200. The method 200 then ends.

With reference to FIGS. 7-10, there is shown a progression of video and/or image data that is obtained using the vehicle camera and the trailer camera, and that is combined with various graphics to obtain a combined image that depicts an area behind the vehicle while mitigating the interference caused by the trailer. In many embodiments, the method 200 described above (FIG. 6) can be used to generate the combined image (FIG. 10) and then present the combined image on a display, such as electronic display mirror 50.

Figure 7:
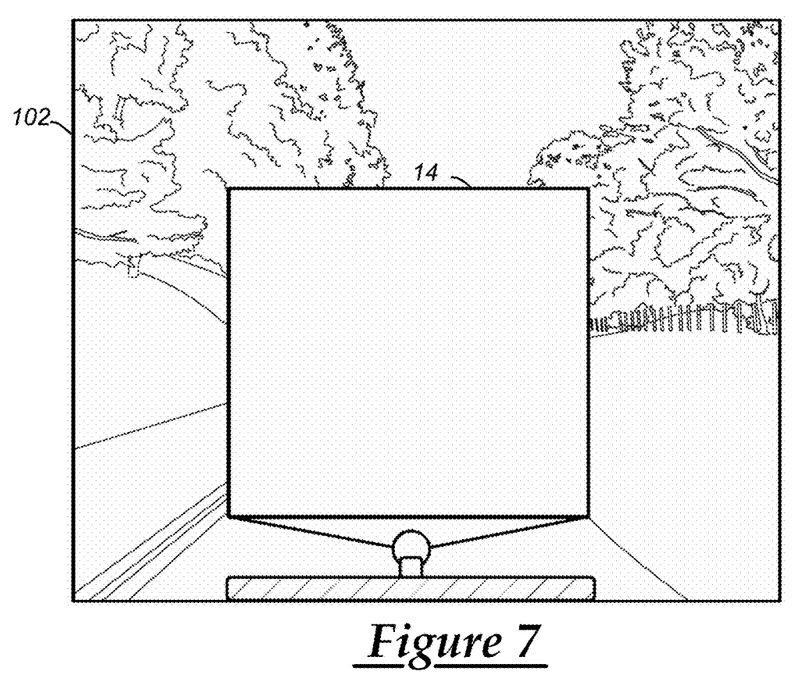
FIG. 7 is a view of an electronic display mirror showing the perspective of a vehicle camera facing an area behind a vehicle that is towing a trailer.
Figure 8:
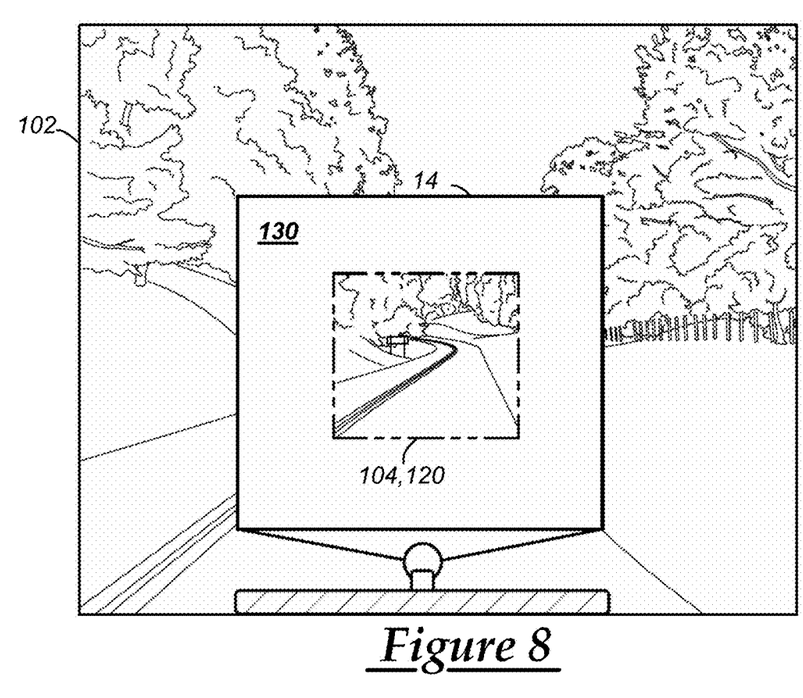
FIG. 8 is a view of an electronic display mirror showing the perspective of a vehicle camera facing an area behind a vehicle that is towing a trailer and that is supplemented by images or video from a trailer camera.

FIG. 7 depicts a first image 102 that is obtained by a rear-facing vehicle camera 22 that shows trailer 14. As illustrated, the trailer 14, which is being towed by vehicle 12, obstructs a portion of the area behind the trailer. This first image 102 can be captured by using the vehicle camera 22 as described in step 210 of method 200 (FIG. 6). FIG. 8 depicts the first image 102, along with a second image 104 that is captured by a trailer camera 72, which is overlaid onto the first image 102 at an image overlay area 120. FIG. 8 includes a patch portion 130 that includes an area of the trailer 14 that is not supplemented by the second image 104 from the trailer camera 72. The second image 104 can be captured by using the trailer camera 72 as described in step 220 of method 200. Moreover, the second image 104 can be overlaid, repositioned and/or resized on the first image 102 at an image overlay position 120 using a variety of different techniques, such as those described above in step 250 of method 200.

Figure 9:
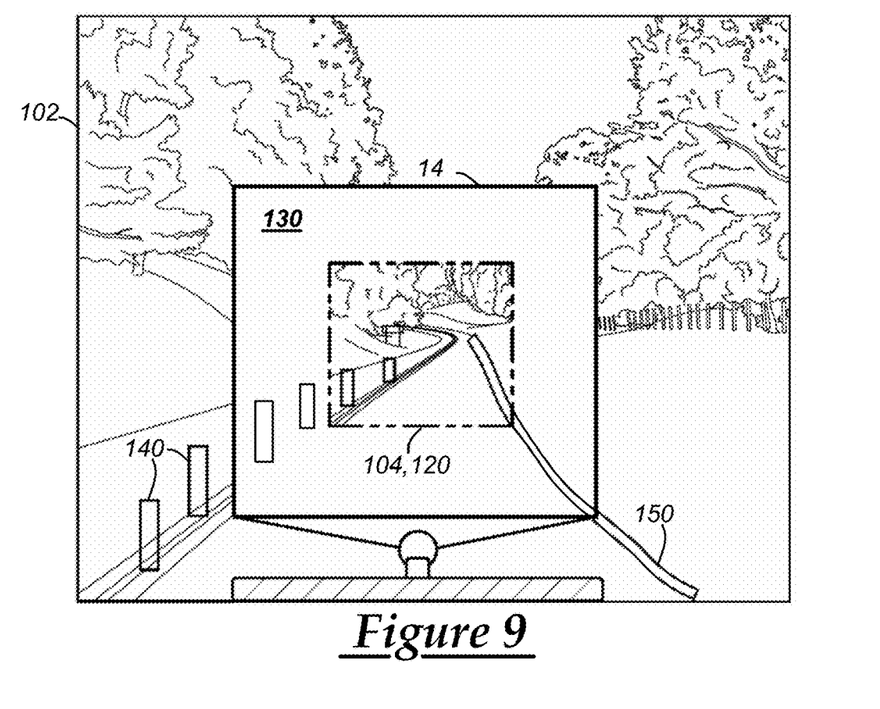
FIG. 9 is a view of an electronic display mirror showing the perspective of a vehicle camera facing an area behind a vehicle that is towing a trailer, that is supplemented by images or video from a trailer camera, and that includes lane marker graphics.
Figure 10:
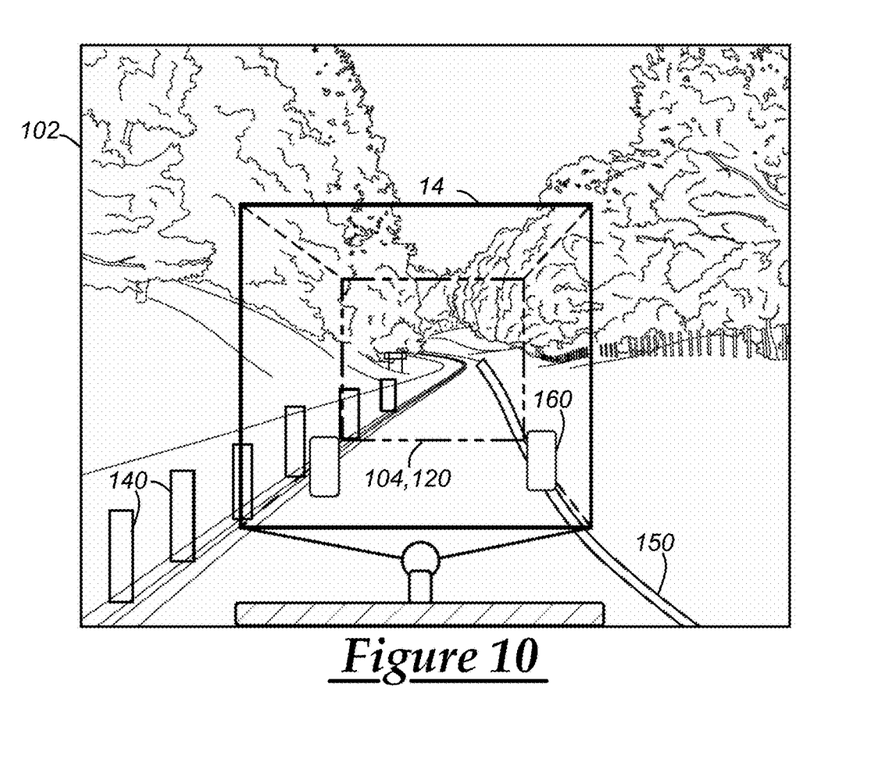
FIG. 10 is an embodiment of a combined image that includes a view of an electronic display mirror showing the perspective of a vehicle camera facing an area behind a vehicle that is towing a trailer, that is supplemented by images or video from a trailer camera, and that includes lane marker graphics, as well as background graphics.

FIG. 9 depicts the aggregate image from FIG. 8, but also includes various graphics that highlight one or more roadway features, such as lane marker graphics 140 and road edge graphic 150. These graphics can be generated and/or rendered according to any of the embodiments discussed above in step 260 of method 200 (FIG. 6). FIG. 10 depicts a combined image that is ready for presentation on a display of the vehicle, such as electronic display mirror 50. FIG. 10 depicts graphics that are generated so as to fill in the patch region 130 and, as illustrated, these graphics can be generated so that they match a background scene behind the vehicle 12 and trailer 14. Scene memorization techniques, such as those discussed above in step 270, can be used to fill in the patch region 130. Additionally, other graphics can be added, such as trailer tire graphics 160 that depict a region in which the trailer wheels are located.

Those skilled in the art will appreciate that the system and/or method discussed herein can be applied to other scenarios as well. In other embodiments, a first camera can be included on and used by the host vehicle (e.g., vehicle 12) and a second camera can be included on another subject, such as another item being towed that is on a trailer (e.g., another vehicle, boat). Or, in other embodiments, a first camera that is on the front of the host vehicle and that faces an area in front of the host vehicle can be used with a second camera on the front of another vehicle that is in front of the host vehicle so as to enable the host vehicle to obtain a combined image of an area in front of the vehicle and that is not (or less) obstructed by the vehicle in front of the host vehicle.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of generating a combined rearview image of an area behind a vehicle that is towing a trailer, the method comprising:
    capturing a first image from a vehicle camera that is installed on the vehicle, the first image being comprised of an area behind the vehicle;
    capturing a second image from a trailer camera that is installed on the trailer, the second image being comprised of an area behind the trailer;
    determining an obstructed viewing region within the first image, the obstructed viewing region being a region of the first image in which the trailer resides;
    removing a non-obstructed portion of the first image, wherein the non-obstructed portion is an area of the first image that is not obstructed by the trailer;
    overlaying at least a portion of the second image at least partially within the obstructed viewing region of the first image; and
    inserting graphics at least in a patch region within the obstructed viewing region and between the second image and the first image, wherein the patch region includes the non-obstructed portion such that at least some of the graphics are inserted into the non-obstructed portion so as to allow a smoother transition to be provided between the first image and the second image that is overlaid at least partially within the obstructed viewing region of the first image.

2. The method of claim 1, further comprising the step of determining an image overlay area within the first image and/or at least partly overlapping the obstructed viewing region, wherein the second image is overlaid within the image overlay area.

3. The method of claim 2, further comprising the step of determining a trailer articulation angle, wherein the image overlay area is determined based at least partly on the trailer articulation angle.

4. The method of claim 3, further comprising the step of processing the second image so that the second image after the processing depicts the area behind the trailer from a perspective having a viewing angle that is the same as a viewing angle of the vehicle camera.

5. The method of claim 4, wherein the processing step is based at least partly on a trailer camera viewing angle and a vehicle camera viewing angle.

6. The method of claim 1, wherein at least some of the graphics do not depict or attempt to depict the area behind the vehicle or the area behind the trailer, and wherein the at least some of the graphics highlight one or more roadway features.

7. The method of claim 1, wherein at least some of the graphics depict or attempt to depict the area behind the vehicle and/or the area behind the trailer.

8. The method of claim 7, wherein the at least some of the graphics are obtained using scene memorization techniques, wherein the scene memorization techniques include the steps of: retaining at least a portion of the first image and, subsequently, recalling the portion of the first image, and using the recalled portion of the first image to fill in at least a portion of the patch regions within the obstructed viewing region.

9. The method of claim 1, further comprising the step of displaying the combined rearview image on an electronic display mirror included in the vehicle, wherein the electronic display mirror is a rearview mirror that enables a vehicle operator or a vehicle passenger to view an area behind the vehicle, and wherein the display of the combined rearview image enables the vehicle operator or the vehicle passenger to view the area behind the vehicle and the area behind the trailer without being obstructed by the trailer.

10. A method of generating a combined rearview image of an area behind a vehicle that is towing a trailer, the method comprising:
    capturing a first image from a vehicle camera that is installed on the vehicle, the first image being comprised of an area behind the vehicle;
    capturing a second image from a trailer camera that is installed on the trailer, the second image being comprised of an area behind the trailer;
    defining an obstructed viewing region within the first image, the obstructed viewing region including a region within the first image that includes the trailer;
    determining an image overlay area within the obstructed viewing region;
    inserting the second image on the first image according to the image overlay area;
    identifying a portion of the first image that corresponds to a patch region that is within the obstructed viewing region and outside the image overlay area, wherein at least part of the patch region includes a non-obstructed portion that is not obstructed by the trailer;
    rendering graphics in the patch region within the obstructed viewing region and outside the image overlay area, wherein the graphics include natural scene graphics that depict or attempt to depict an area within the obstructed viewing region and outside the second image, and wherein at least some of the graphics are inserted into the non-obstructed portion so as to allow a smoother transition to be provided between the first image and the second image; and
    displaying a combined image on an electronic display that is installed in the vehicle, wherein the combined image includes at least part of the first image, at least part of the second image, and the rendered graphics.

11. The method of claim 10, wherein the method is at least partly carried out by an onboard computer installed in the vehicle, wherein the onboard computer carries out the defining step, the determining step, the inserting step, and the rendering step.

12. The method of claim 11, further comprising the step of receiving the first image and the second image at the onboard computer, wherein the second image is received via a vehicle-trailer interface.

13. The method of claim 11, wherein a plurality of iterations of the method are carried out including a first iteration and a second iteration, wherein one or more steps of the first iteration are carried out after one or more steps of the second iteration, wherein the first iteration is completed before the second iteration.

14. The method of claim 11, wherein a plurality of iterations of the method are carried out including a first iteration and a second iteration, wherein the first iteration includes retaining at least a portion of the first image in memory of the onboard computer during the a first iteration, and wherein the rendering step of the second iteration includes using the retained portion of the first image to render the graphics of the second iteration.

15. The method of claim 14, wherein the second iteration further comprises the step of obtaining a speed of the vehicle, and wherein the rendering step of the second iteration is at least partially based on the obtained speed of the vehicle.

16. The method of claim 10, further comprising the step of overlaying graphics on the combined image that direct or attempt to direct a vehicle operator's or a vehicle passenger's attention to a roadway feature.

17. A vehicle rearview vision system for use with a vehicle, comprising:
a vehicle camera installed on the vehicle, wherein the vehicle camera is configured to capture an area behind the vehicle;
an electronic display installed on the vehicle;
an onboard computer installed on the vehicle, wherein the onboard computer includes a processor and a non-transitory computer-readable memory, wherein the memory includes a computer program product that, when executed by the processor, causes the vehicle to carry out a combined image generation process that includes:
obtaining a first image from the vehicle camera, the first image being comprised of the area behind the vehicle;
obtaining a second image from a trailer camera that is installed on a trailer being towed by the vehicle, the second image being comprised of an area behind the trailer;
determining an obstructed viewing region within the first image, the obstructed viewing region being a region of the first image in which the trailer resides;
removing a non-obstructed portion of the first image, wherein the non-obstructed portion is an area of the first image that is not obstructed by the trailer;
overlaying at least a portion of the second image at least partially within the obstructed viewing region of the first image;
inserting graphics in a patch region within the obstructed viewing region and between the second image and the first image, wherein the patch region includes the non-obstructed portion such that at least part of the graphics are inserted into the non-obstructed portion so as to allow a smoother transition to be provided between the first image and the second image that is overlaid at least partially within the obstructed viewing region of the first image; and
displaying a combined image on the electronic display, wherein the combined image includes at least part of the first image, at least part of the second image, and the inserted graphics.

18. The vehicle rearview system of claim 17, further comprising a vehicle wheel speed sensor, and wherein some of the graphics are generated based on a vehicle wheel speed reading from the vehicle wheel speed sensors.

19. The vehicle rearview system of claim 17, wherein the memory includes image recognition software that enables the onboard computer to identify roadway features and, wherein the image recognition software is used in conjunction with the computer program product to render graphics for display in regions of the combined image corresponding to the identified roadway features.

20. The vehicle rearview system of claim 17, wherein the computer program product, when executed by the processor, further causes the vehicle to retain at least a portion of the first image in memory of the onboard computer during the a first iteration of the combined image generation process, and wherein the rendering step of a second iteration of the combined image generation process includes using the retained portion of the first image to render the graphics of the second iteration.

* * * * *